(12) United States Patent
Yu et al.

(10) Patent No.: US 6,705,733 B1
(45) Date of Patent: Mar. 16, 2004

(54) COLOR WHEEL AND WASHER THEREOF

(75) Inventors: An-Hwa Yu, Shinjuang (TW); Ke-Shu Chin, Junghe (TW); Chih-Neng Chang, Taipei (TW); Yin-Tai Keng, Taipei (TW); Chih-Huang Wang, Shulin (TW); Kuang-Hua Chang, Junghe (TW)

(73) Assignee: Prodisc Technology Inc. (TW)

( * ) Notice: Subject to any disclaimer, the term of this patent is extended or adjusted under 35 U.S.C. 154(b) by 0 days.

(21) Appl. No.: 10/369,582

(22) Filed: Feb. 21, 2003

(30) Foreign Application Priority Data

Oct. 2, 2002 (TW) ...................................... 91215568 U

(51) Int. Cl.$^7$ .............................................. G03B 21/14
(52) U.S. Cl. ........................ 353/84; 348/743; 359/889; 359/892
(58) Field of Search ........................... 353/84; 348/743, 348/835; 359/580, 889–892

(56) References Cited

U.S. PATENT DOCUMENTS

| | | | | | |
|---|---|---|---|---|---|
| 3,982,825 | A | * | 9/1976 | Mitchell | 359/887 |
| 4,800,474 | A | * | 1/1989 | Bornhorst | 362/293 |
| 5,777,694 | A | * | 7/1998 | Poradish | 348/743 |
| 5,868,482 | A | * | 2/1999 | Edlinger et al. | 353/84 |
| 5,921,650 | A | * | 7/1999 | Doany et al. | 353/31 |
| 6,024,453 | A | * | 2/2000 | Edlinger et al. | 353/84 |
| 6,504,598 | B2 | * | 1/2003 | Kitano | 355/71 |

* cited by examiner

*Primary Examiner*—Russell Adams
*Assistant Examiner*—Michael Dalakis
(74) *Attorney, Agent, or Firm*—Birch, Stewart, Kolasch & Birch, LLP

(57) ABSTRACT

A color wheel including a motor, a color filter and a washer. The color filter is set on the motor. The washer is set both on the motor and the color filter and the color filter is set between the washer and the motor. A recess is formed between a circumferential edge of an outer surface of the washer and the color filter. In addition, the invention also provides a washer of a color wheel.

12 Claims, 6 Drawing Sheets

COLOR WHEEL AND WASHER THEREOF

This nonprovisional application claims priority under 35 U.S.C. §119(a) on Patent Application No. 091215568 filed in TAIWAN, R.O.C. on Oct. 2, 2002, which is herein incorporated by reference.

BACKGROUND OF THE INVENTION

1. Field of the Invention

The invention relates to a color wheel and a washer thereof, and in particular, to a color wheel and a washer of the color wheel, both of which are used in the projection technology.

2. Description of the Related Art

Digital Light Processing (DLP) is a widely used projection technology. DLP has several advantages, including, high brightness, accurate tone reproduction, a fast response time, noise-free operation, and thin and light composition.

In a DLP projector, a digital control method and a reflection principle are adopted. Light rays from the light source are collected and focused by the lens to pass through three color filters. The light rays are then projected onto a Digital Micro-mirror Device (DMD). Since the DMD includes several movable micro mirrors, driving electrodes may control the tilt angle and deflection time of each movable mirror. Then, the light rays are projected to form an image by switching the direction of the light ray reflections.

In the DLP projector, a color wheel 4 for generating the light rays of several colors is generally provided. Referring to FIG. 1, the color wheel 4 mainly includes a motor 41, a color filter 42 and a washer 43. The washer 43 and the color filter 42 are mounted on the motor 41. In this case, the motor 41 includes a housing 411 and a motor body 412, which rotates together with the housing 411.

Additionally, the color wheel is also used in Liquid Crystal on Silicon (LCOS) projectors and Liquid Crystal Display (LCD) projectors. Herein, the function of the color wheel is the same as in DLP projectors for separating the light rays into several colors.

In general, the motor for the color wheel rotates at a speed higher than 7200 rpm. When the rotation center of the motor is away from the central axis of the rotation shaft (i.e., when the rotation center is not located on the central axis of the rotation shaft), the operation of the color wheel may be adversely influenced by vibration and noise. Further, the operational reliability of the color wheel may decrease. In addition, the color filter and the washer are mounted on the housing by using an adhesive. When the color filter and the washer are coated with too much adhesive, or the relative position of the color filter and the washer is moved, the adhesive may overflow. In this case, the overflowing adhesive may pollute the color filter. Further, the definition and the clear scope of the color filter may be decreased.

It is therefore an important objective of the invention to provide a color wheel and a washer of the color wheel to solve the problem mentioned above.

SUMMARY OF THE INVENTION

An objective of the invention is to provide a color wheel and a washer of the color wheel, each of which may have the advantages of correcting the rotation center, reducing vibration and noise, avoiding adhesive overflow, proving the definition and the clear scope of the color filter, and improving the operational reliability of the color wheel.

To achieve the above-mentioned objective, the invention provides a color wheel including a motor, a color filter and a washer. The color filter is set on the motor. The washer is set both on the motor and the color filter and the color filter is set between the washer and the motor. In this case, a circumferential washer surface is formed with a groove and a recess is formed between a circumferential edge of the outer surface of the washer and the color filter. In addition, the invention also provides a washer of the color wheel.

As mentioned above, the invention provides a color wheel and a washer of the color wheel, in each of which a specific groove is formed in the washer. Compared to the prior art, the difficulty of positioning in this invention may be decreased by fitting or adhering the counterpoise into the groove of the color wheel. Furthermore, since the counterpoise may be placed totally within the groove, it is free from collisions. Also, the influence on the counterpoise caused by centrifugal force is reduced. Moreover, since the rotation center of the color wheel may be corrected, the vibration and noise caused by the color wheel is further reduced. In addition, the recess between the washer and the color filter may absorb an excess of adhesive between the color filter and the washer. In other words, an excess of adhesive may flow into the recess, so that the pollution of the color filter caused by the adhesive is avoided. Furthermore, the definition and the clear scope of the color filter are proved, and the operational reliability of the color wheel is also improved.

BRIEF DESCRIPTION OF THE DRAWINGS

The invention will become more fully understood from the detailed description given in the herein below illustration, and thus are not limitative of the present invention, and wherein.

DETAILED DESCRIPTION OF THE INVENTION

The color wheel and the washer of the color wheel in accordance with preferred embodiments of the invention will be described with reference to the accompanying drawings.

Figure 1:
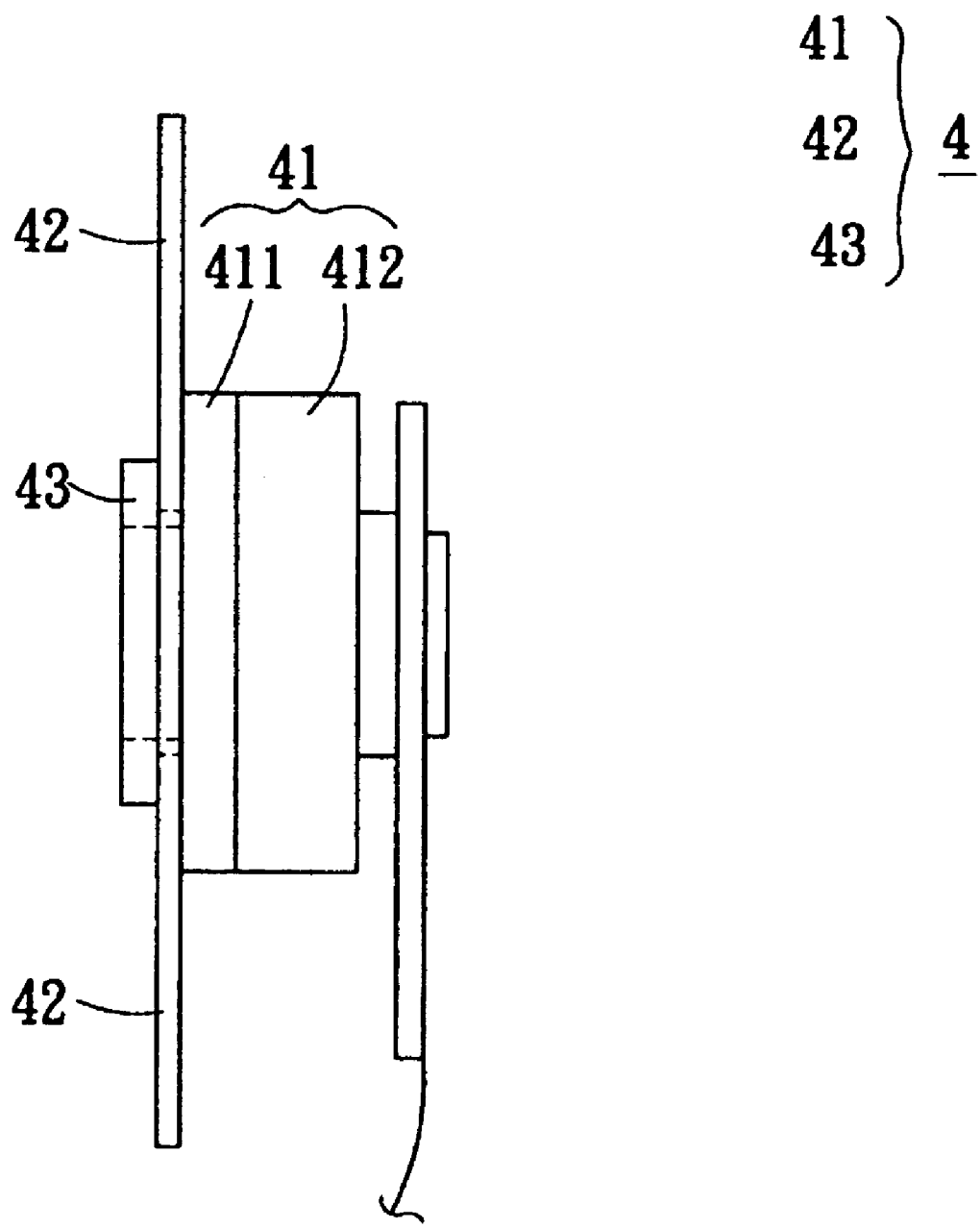
FIG. 1 is a schematic illustration that shows a side view of a conventional color wheel.
Figure 2A:
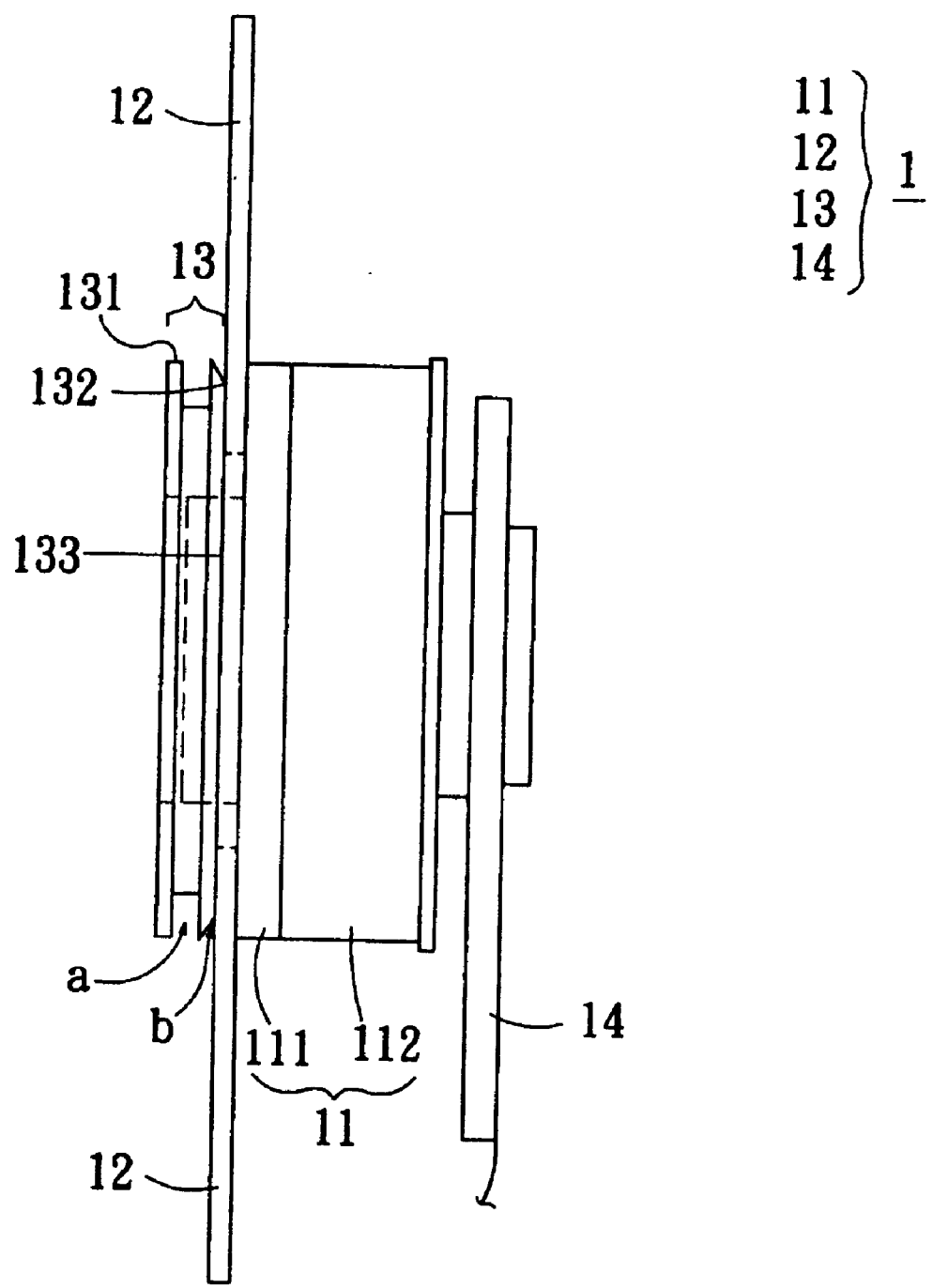
FIG. 2A and FIG. 2B are schematic illustrations that show side views of the color wheel in accordance with an embodiment of the invention.
Figure 2B:
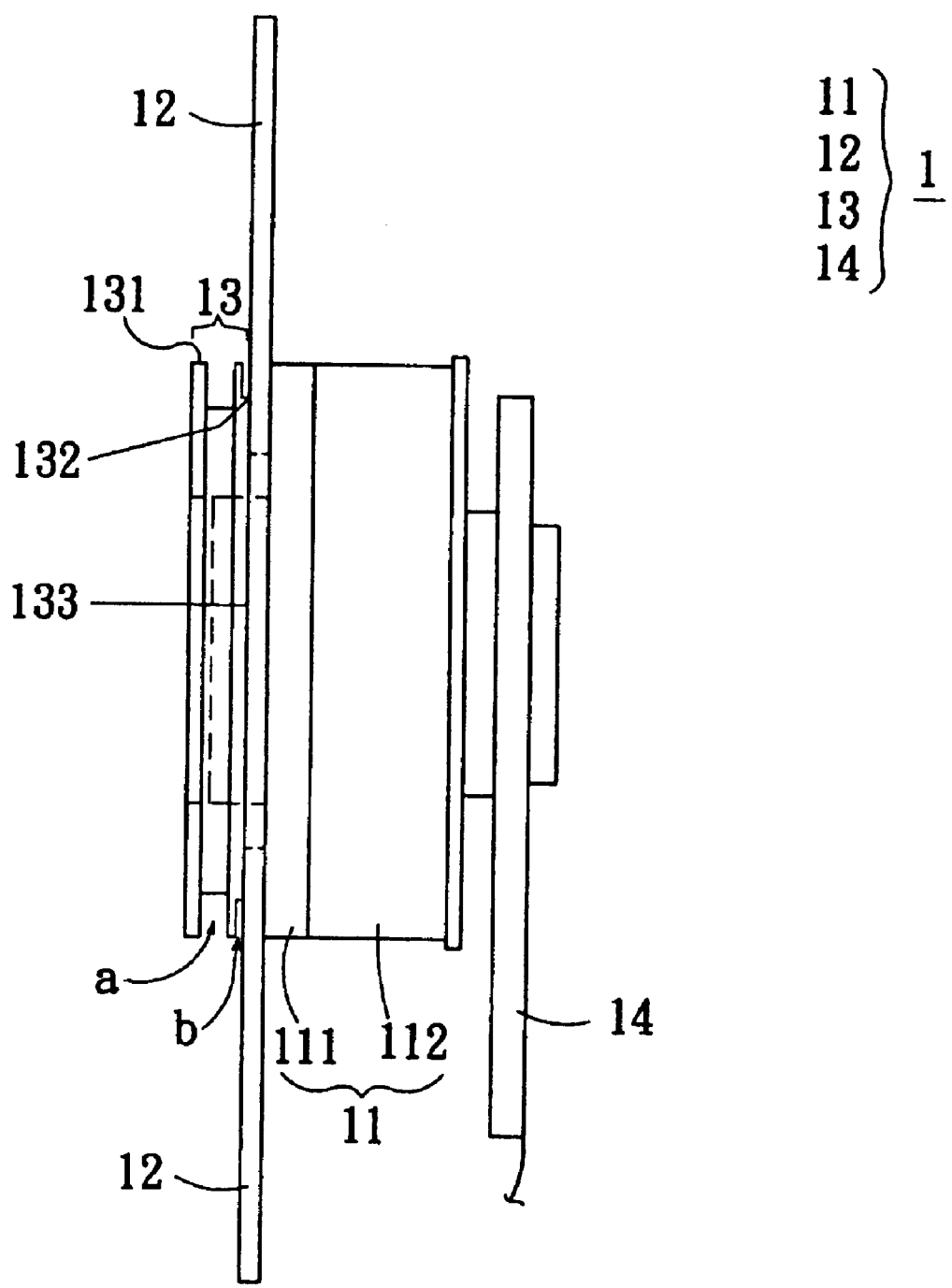

Referring to FIG. 2A and FIG. 2B, a color wheel 1 provided by an embodiment of the invention includes a motor 11, a color filter 12 and a washer 13. The color filter 12 is set on the motor 11. The washer 13 is set both on the motor 11 and the color filter 12. In this case, a circumferential washer surface 131 is formed with a groove (letter a), the outer circle 132 of the washer surface 133. joined with the color filter 12 is formed with a recess (letter b).

In this embodiment, as shown in FIG. 2A and FIG. 2B, the motor 11 includes a housing 111 and a motor body 112. The housing 111 is set to one side of the central axis of the motor body 112 and rotates together with the motor body 112. Herein, the motor body 12 mainly includes a shell (not shown), a magnetic ring (not shown), a laminated steel stack (not shown) and a coil (not shown). When the coil is turned on, the laminated steel stack produces a magnetic force and a magnetic field. The positive or negative properties as well as the intensity of the current may cause the magnetic field to vary in an ordered manner. That is, a rotary magnetic field will cooperate with the magnetic ring, which will rotate accordingly.

Referring to FIG. 2A and FIG. 2B, the color filter 12 is set on the housing 111 by way of, for example, a fitting or adhering process. In the current embodiment, the color filter 12 is a circular filter or a ring-shaped filter composed of three or more filter sectors of red, green and blue. The color filter 12 may also be a circular filter or a ring-shaped filter composed of one transparent block and three or more filter sectors of red, green and blue.

Referring again to FIG. 2A and FIG. 2B, the circumferential washer surface 131 is formed with a groove (letter a), the outer circle 132 of the washer surface 133 joined with the color filter 12 is formed with a recess (letter b).

Herein, the groove (letter a) may be a ring-shaped groove or a substantially ring-shaped groove. In addition, the recess (letter b) is a ring-shaped recess or a substantially ring-shaped recess. In this case, the recess (letter b) of the washer 13 is bonded to the color filter 12, and a side view of the axial direction of the bonding position is an oblique opening (as shown in FIG. 2A). Also, a side view of the axial direction of the bonding position is a right angle opening (as shown in FIG. 2B).

Figure 3:
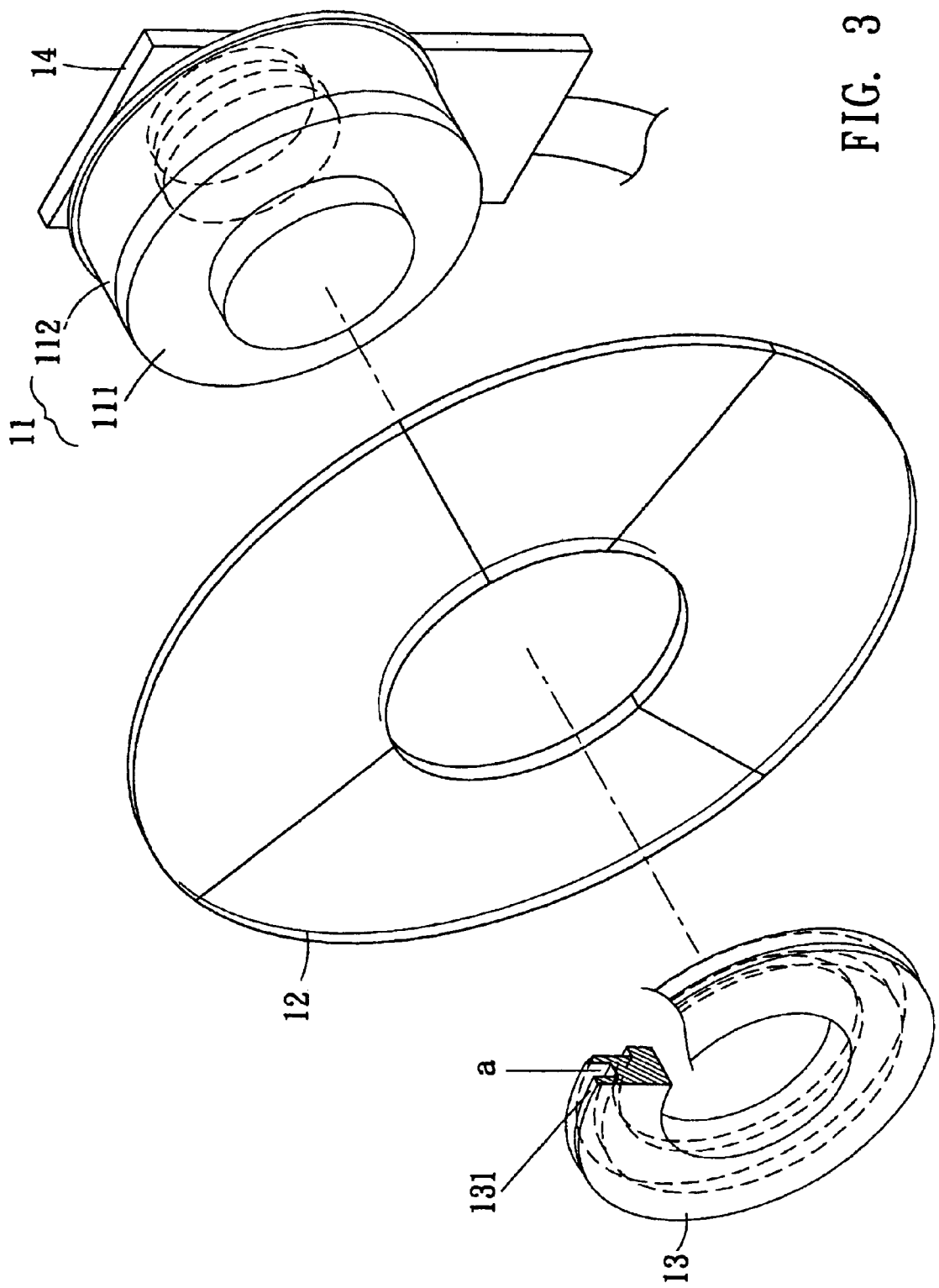
FIG. 3 is a partially pictorial and exploded view of FIG. 2A.

FIG. 3 is a partially pictorial and exploded view of FIG. 2A.

After the color wheel 1 rotates for a period of time, the rotation center of the color wheel may be offset from the central axis (not shown) due to prolonged usage. Therefore, when the rotation center is not positioned on the central axis, vibration and noise may result and the operational reliability may be adversely affected.

Figure 4:
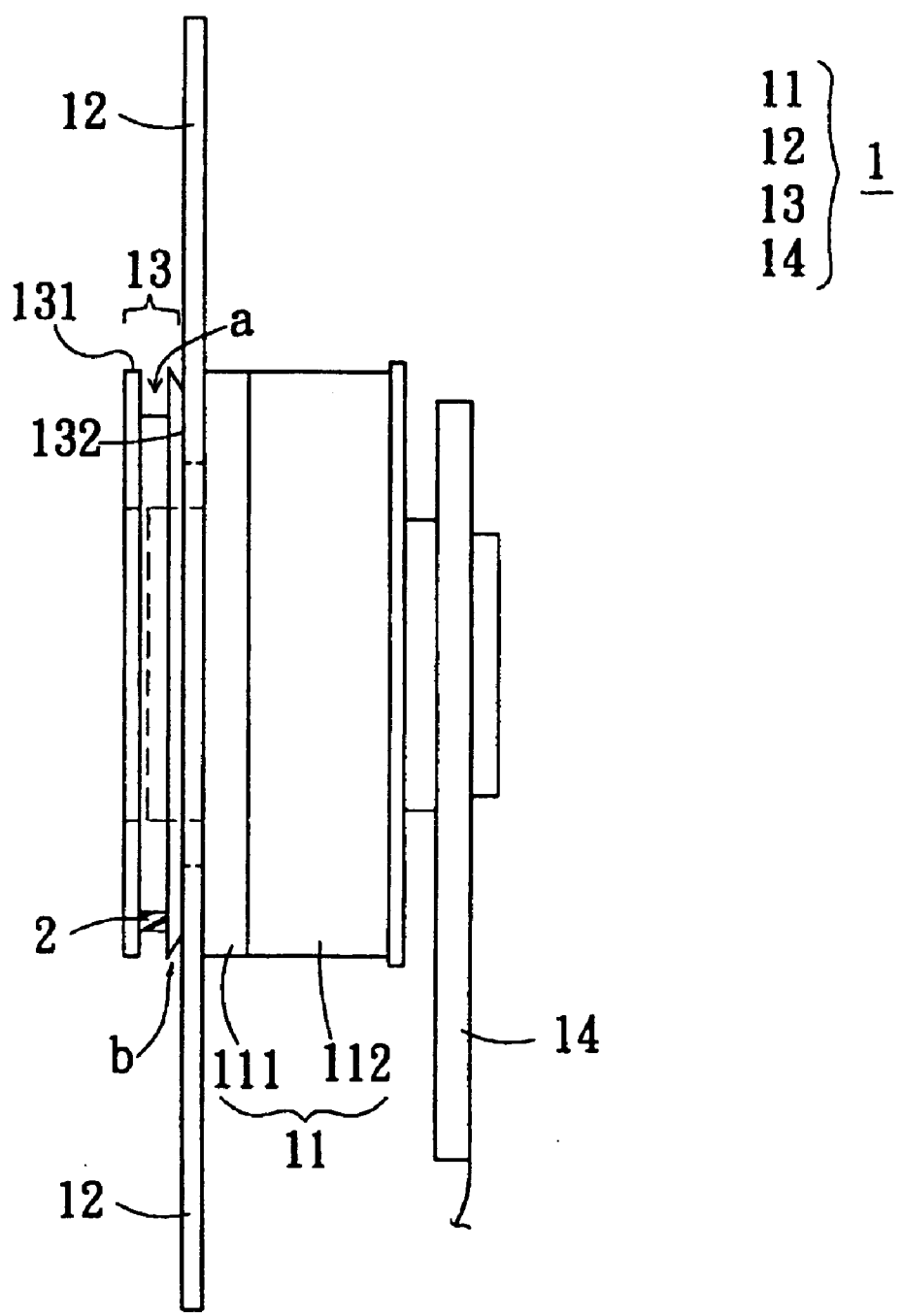
FIG. 4 is a schematic illustration that show a side view of the color wheel cooperating with the counterpoise in accordance with an embodiment of the invention.

Referring to FIG. 4, in this embodiment, a counterpoise 2, which may be any block or counterbalance the unit, having a predetermined weight, is used to correct the rotation center. The correction method is performed by fitting or engaging the counterpoise 2 to the groove (letter a), and using a machine to adjust the position of the counterpoise 2 in the groove (letter a) according to the degree of displacement of the rotation center. The counterpoise 2 may also be adhered to the groove (letter a).

In this embodiment, the washer 13 is set on the color filter 12 and the housing 111 by an adhering process. Since the contact area between the color filter 12 and the housing 111 is deficient, the position of the rotation center may move. Herein, the washer 13 is used to enlarge the contact area between the color filter 12 and the housing 111.

In this embodiment, the washer 13 is adhered to the color filter 12 with an adhesive. If an excessive amount of adhesive coating is placed on the color filter 12 and the washer 13, any excess adhesive may be absorbed by the recess (letter b) of the washer 13. In other words, an excess of adhesive may flow into the recess (letter b), so that the pollution of the color filter 12 caused by excess adhesive is avoided.

Herein, the color filter 12 is adhered to the housing 111, the washer 13 is then adhered to both the housing 111 and the color filter 12. The color filter 12 is also adhered to the washer 13. Both are then adhered to the housing 11.

Referring again to FIG. 2A and FIG. 2B, the color wheel 1 of this embodiment further includes a positioning plate 14 on which the motor body 112 is pivotally mounted. The positioning plate 14 is connected to an actuator (not shown) via wires (not shown). The actuator drives the motor body 112 to rotate about a central axis corresponding to the pivotal point between the positioning plate 14 and the motor body 112.

Figure 5A:
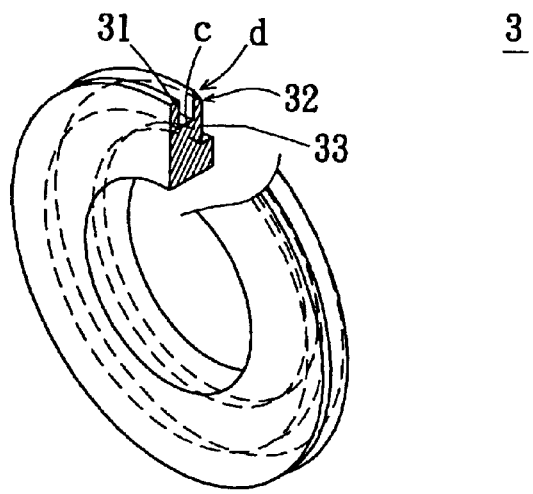
FIG. 5A and FIG. 5B are schematic illustrations that show pictorial views of the washers in accordance with another embodiment of the invention.
Figure 5B:
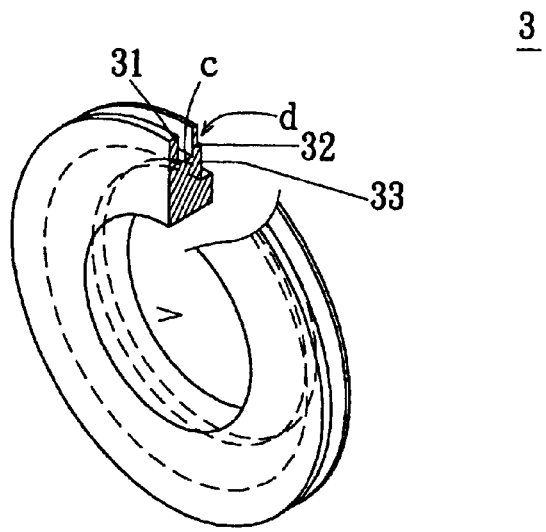

In addition, as shown in FIG. 5A and FIG. 5B, another embodiment of the invention provides a washer 3 for a color wheel. In this case, the color wheel includes a washer 3, a color filter and a motor. The washer 3 is set on the motor and the color filter. Herein, a circumferential washer surface 31 is formed with a groove (letter c), the outer circle 32 of the washer surface 33 joined with the color filter is formed with a recess (letter d).

Since the elements in this embodiment have the same features and functions as those of the corresponding elements in the color wheel 1, detailed description thereof will be omitted.

In this invention, the invention provides a color wheel and a washer of the color wheel, in each of which a specific groove is formed in the washer. Compared to the prior art, the difficulty of positioning in this invention may be decreased by fitting or adhering the counterpoise into the groove of the color wheel. Furthermore, since the counterpoise may be placed totally within the groove, it is free from collisions. Also, the influence on the counterpoise caused by centrifugal force is reduced. Moreover, since the rotation center of the color wheel may be corrected, the vibration and noise caused by the color wheel is further reduced. In addition, the recess between the washer and the color filter may absorb an excess of adhesive between the color filter and the washer. In other words, an excess of adhesive may flow into the recess, so that the pollution of the color filter caused by the adhesive is avoided. Furthermore, the definition and the clear scope of the color filter are proved, and the operational reliability of the color wheel is also improved.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A color wheel, comprising:
   a motor;
   a color filter set on the motor; and
   a washer set both on the motor and the color filter, and said color filter set between said washer and said motor, wherein a circumferential washer surface is formed with a groove, and a recess is formed between a circumferential edge of an outer surface of the washer and the color filter.

2. The color wheel according to claim 1, wherein the recess of the washer is a ring-shaped recess.

3. The color wheel according to claim 2, wherein the recess of the washer is bonded to the color filter, a side view of the axial direction of the bonding position being an oblique opening.

4. The color wheel according to claim 2, wherein the recess of the washer is bonded to the color filter, the side view of the axial direction of the bonding position being a right angle opening.

5. The color wheel according to claim 1, wherein the groove of the washer is a ring-shaped groove.

6. The color wheel according to claim 1, wherein the motor includes a housing and a motor body, the housing being set to a side of a central axis of the motor body.

7. The color wheel according to claim 1, further comprising a positioning plate on which the motor body is pivotally mounted.

8. A washer of a color wheel, the color wheel comprising a motor, a color filter and the washer, the washer being set on the motor and the color filter and said color filter set between said washer and said motor, characterized in that a circumferential washer surface is formed with a groove, and a recess is formed between a circumferential edge of an outer surface of the washer and the color filter.

9. The washer according to claim 8, wherein the recess of the washer is a ring-shaped recess.

10. The washer according to claim 9, wherein the recess of the washer is bonded to the color filter, a side view of the axial direction of the bonding position being an oblique opening.

11. The washer according to claim 9, wherein the recess of the washer is bonded to the color filter, the side view of the axial direction of the bonding position being a right angle opening.

12. The washer according to claim 8, wherein the groove of the washer is a ring-shaped groove.

* * * * *